Aug. 15, 1939.    J. E. MALOWAN    2,169,589
MANUFACTURE OF PHOSPHORIC ACID
Filed Dec. 23, 1936
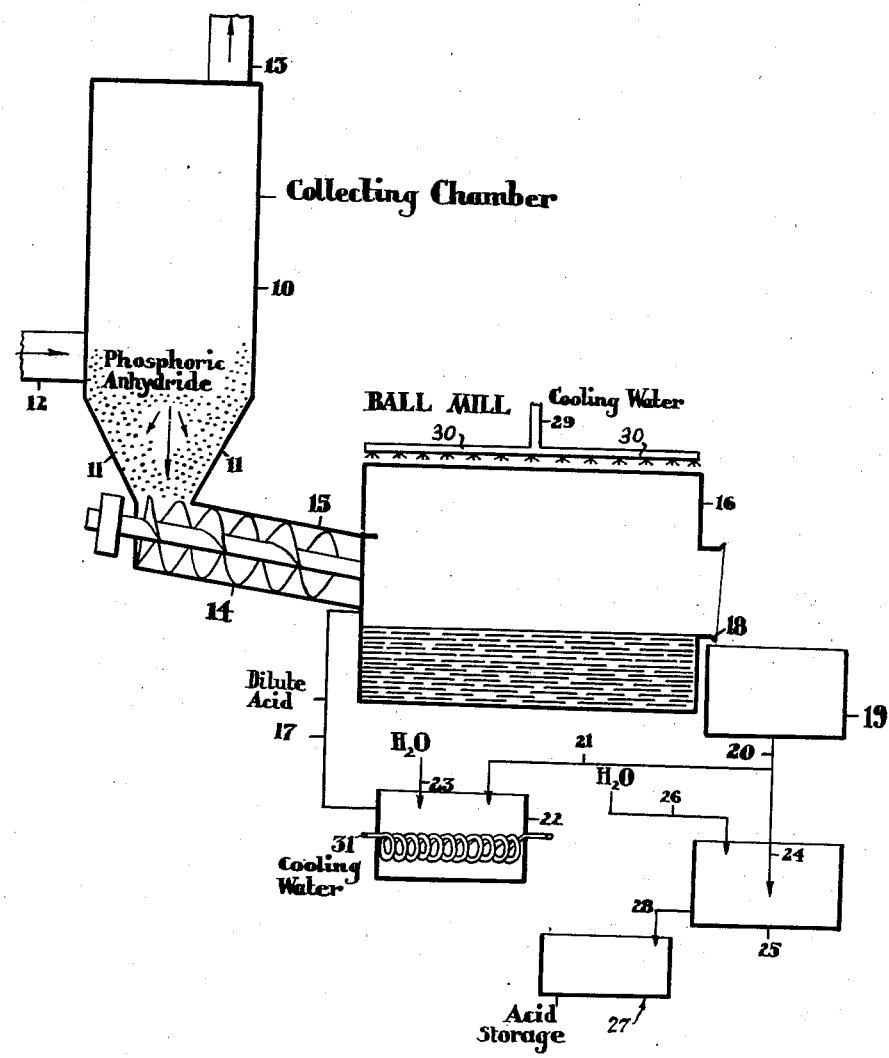
John E. Malowan
INVENTOR
BY
ATTORNEY Patented Aug. 15, 1939

2,169,589

UNITED STATES PATENT OFFICE 2,169,589

MANUFACTURE OF PHOSPHORIC ACID

John E. Malowan, Dayton, Ohio, assignor to Monsanto Chemical Company, a corporation of Delaware Application December 23, 1936, Serial No. 117,258

2 Claims. (Cl. 23—165)

This invention relates to a process for the manufacture of phosphoric acid.

One of the objects of the present invention is the provision of a process for the manufacture of phosphoric acid. A further object is the provision of a continuous process for the manufacture of phosphoric acid by the hydration of phosphoric anhydride.

If phosphoric anhydride, $P_2O_5$, be added to water, a vigorous reaction occurs so that a portion of the light fluffy anhydride is expelled by the steam formed resulting in a loss to the process. Strong orthophosphoric acid up to 100% $H_3PO_4$ content may be employed in place of water for the hydration of phosphoric anhydride, and the violence of the reaction considerably mitigated.

However, when employing strong acids for hydration, the anhydride tends to form lumps which are coated either with meta phosphoric acid or with a complex composed of meta phosphoric acid and phosphoric anhydride. In any case such coating upon the lumps of anhydride is difficultly soluble and hence the lumps may remain in suspension in the strong acid for long periods of time without dissolving.

I have now found that if I provide a relatively large body of strong phosphoric acid say from 90% to 100% or more percent $H_3PO_4$ concentration, maintained at a low temperature, that is from 45° to 100° C., I may continuously and simultaneously add phosphoric anhydride and a weaker acid in a constant regulated amount and intimately mix the same together in said body of strong acid and thereby cause hydration of the former to take place without excessive heating and without the production of insoluble material and as a result avoid losses of anhydride. The process which I have herein provided is furthermore capable of being rapidly worked in a continuous manner. As a result of operating in this way, I find that I obtain a considerable elimination of fluorine. Experiments have shown that approximately 80% to 90% of the fluorine present in the anhydride is eliminated. Since the anhydride usually contains from 30 to 50 parts per million of fluorine, acid having between 3 and 6 parts may be easily produced, thus generally making unnecessary any further treatment for fluorine elimination.

My process will be explained by reference to the accompanying drawing the single figure depicting a flow sheet thereof.

Chamber 10 which may be a simple iron box provided with a hopper bottom 11 is connected to a phosphorus burner by conduit 12. The phosphorus burner which is not shown, may be of any approved type in which phosphorus is burned in an excess of previously dried air, and supplies the powdery phosphoric anhydride, suspended in air to the conduit 12. The powdery anhydride, upon reaching the enlarged chamber 10, settles out substantially completely, the waste gases passing out of chamber 10 by means of pipe 13. The anhydride collects in the hopper 11 of chamber 10 and by means of conveyor 14 working within conveyor shell 15, is conveyed from hopper 11 to a mixing device 16, which in the present embodiment takes the form of a ball mill constructed of acid proof material. The ball mill has previously been charged with strong phosphoric acid of such strength as has been found workable in my present invention. The ball mill is rotated, and as the anhydride is mechanically introduced by the screw 14, a stream of acid of strength such as is hereinafter set forth, is also introduced by means of acid supply pipe 17. The temperature of the acid in the ball mill or such other mixing device as may be employed, is maintained at a temperature of from 45° to 100° C. or even higher. Cooling water is applied externally to the mixing device as at 29 and 30. Under these conditions rapid and complete hydration of the anhydride is obtained.

The acid supplied by pipe 17 and the anhydride supplied by the screw 14 are both adjusted to the point where an acid having a strength of from 85% to 100% $H_3PO_4$ content is obtained. The acid is discharged from mill 16 by means of the discharge port 18.

The discharged acid is collected in tank 19, from which a portion thereof is conveyed to tank 22 by pipes 20 and 21. Water is then added as by pipes 23 to the acid in tank 22 and the dilution carried to the point where the acid has a concentration substantially below the strength in the mixing device 16. Since the quantity of water added at this point may be widely varied depending primarily upon the amount of cooling applied to the mixing device 16, it is possible to work with acid concentrations ranging upwardly from very weak acids to strengths approaching that prevailing in the mixing device. I may even employ water introducing the same through pipe 17 in place of the diluted acid. It will be understood that the weaker the acid employed as diluting acid in the mixing device the greater the proportion of anhydride required since I aim to maintain within mixer 16 a substantially constant acid concentration.

As the acid is recycled from tank 19 through tank 22, and diluted therein I provide a cooling coil 31 within said latter tank in order to remove heat generated by dilution therein. Such diluted acid is normally cooled to between 45° and 100° C.

The remainder of the acid collected in tank 19 is conveyed by pipe 24 to tank 25 wherein it may be diluted by the addition of water to make any of the weaker acids desired. Such acid is conveniently discharged from outlet pipe 28 into tank 27 the latter being provided for storage purposes.

The process herein described is capable of considerable variation in the type of apparatus employed as is herein noted. In place of screw conveyor 14, I may employ other feeding means. Ball mill 16 which may be operated with or without balls or rods is employed solely as a mixing and cooling device and may be replaced by a covered tank provided with a mechanically driven stirrer. It is of course understood that all parts coming into contact with the acids are constructed of acid proof materials such as enameled iron, ceramic materials or stainless steel.

My process embodying as it does an entirely new method of hydration of the dry anhydride by mixing together in a relatively large body of strong acid and preferably simultaneously a weaker acid or even water with the anhydride provides a method of working which is capable of expansion to large capacities. By so operating, the violence of the reaction is subdued, cooling is more effective and losses are prevented.

Having now particularly described my invention and the manner in which it may be operated, I desire that it not be limited except as indicated by the prior art or as pointed out by the appended claims.

What I claim is:

1. A process for manufacturing phosphoric acid in a substantially continuous manner comprising continuously mixing together in one part of a large body of phosphoric acid of strength ranging from 90% to 100% $H_3PO_4$ content and at a temperature of from 45° to 100° C. whereby difficultly soluble metaphosphoric acid is dissolved substantially dry solid phosphoric anhydride and a previously cooled phosphoric acid of lower strength, withdrawing a portion of said body of phosphoric acid from a remote part of said body of acid, diluting a part thereof to produce said lower strength acid, and continuously returning to said body of phosphoric acid the said lower strength acid and an amount of phosphoric anhydride to produce therewith 90% to 100% $H_3PO_4$.

2. A process for manufacturing phosphoric acid in a substantially continuous manner comprising continuously mixing together, in one part of a large body of phosphoric acid of strengths ranging from 90% to 100% $H_3PO_4$, and at temperatures from 45° to 100° C. whereby difficultly soluble metaphosphoric acid is dissolved substantially dry, solid phosphoric anhydride and a phosphoric acid of lower strength, cooling said acid, withdrawing a portion of said body of phosphoric acid from a remote part of said body of acid, diluting a part thereof to produce said lower strength acid, cooling said diluted acid and continuously returning to said body of phosphoric acid, the said lower strength acid and an amount of phosphoric anhydride to produce therewith an acid of 90 to 100% $H_3PO_4$ content.

JOHN E. MALOWAN.